United States Patent [19]
Linsig

[11] 3,738,175
[45] June 12, 1973

[54] DEVICE FOR DETECTING THE THERMAL OVERLOADS OF A ROTATING MEMBER

[75] Inventor: André Linsig, Belfort, France

[73] Assignee: U N E L E C, Paris, France

[22] Filed: Oct. 4, 1971

[21] Appl. No.: 186,300

[52] U.S. Cl.................. 73/362 CP, 310/66, 338/32
[51] Int. Cl. .............................................. G01k 5/18
[58] Field of Search................ 310/DIG. 1, DIG. 3, 310/DIG. 4, DIG. 5, 162, 67, 66, 4; 338/32; 324/45, 46; 323/94 H; 179/100.2 CH; 73/365 CP

[56] References Cited
UNITED STATES PATENTS

| | | | |
|---|---|---|---|
| 3,568,180 | 3/1971 | Rosch | 179/100.2 CH |
| 3,359,522 | 12/1967 | Albrecht | 323/94 H |
| 3,648,155 | 3/1972 | Soehner | 323/94 H |
| 3,209,078 | 9/1965 | Neumann | 179/100.2 CH |
| 3,200,207 | 8/1965 | Rainer | 179/100.2 CH |

OTHER PUBLICATIONS

Heumann; "5 Uses for Hall Transducers," 1/64; pp. 57;58.

Primary Examiner—R. Skudy
Attorney—Craig, Antonelli & Hill

[57] ABSTRACT

A device for detecting thermal overload in a rotating member includes a piece made from magnetic material having a Curie point corresponding to the temperature to be detected disposed on said rotating member so as to rotate along a path adjacent a stationary magnetic bridge consisting of two arms through which pass opposite fluxes of equal magnitude separated by an air gap in which a magnetic detector is located so that an increase in temperature of the rotating member beyond the Curie point of the magnetic piece can be detected by the magnetic detector as a reduction in signal level or a complete loss of signal.

5 Claims, 5 Drawing Figures

PATENTED JUN 12 1973 3,738,175
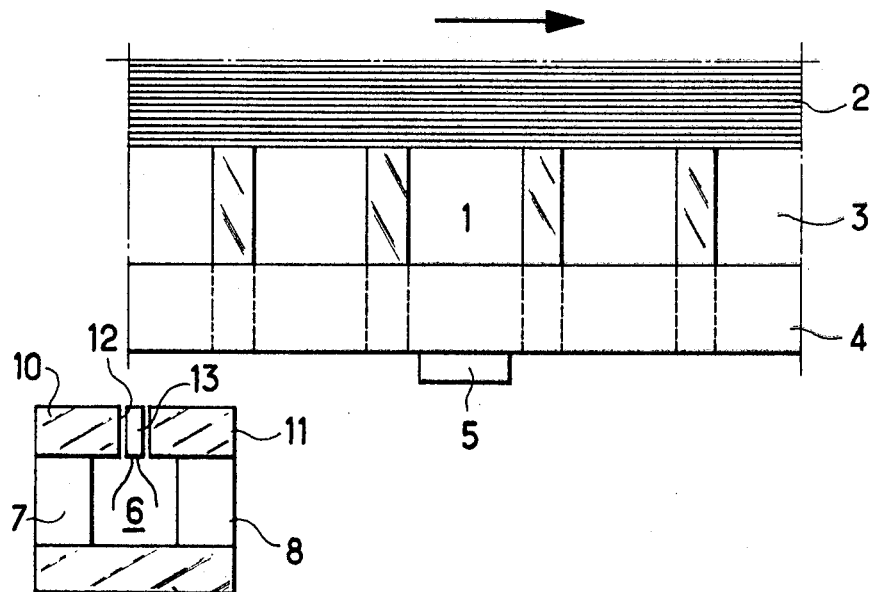
FIG.1
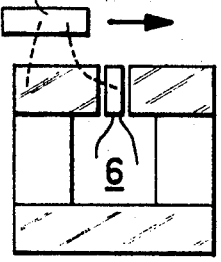
FIG.2
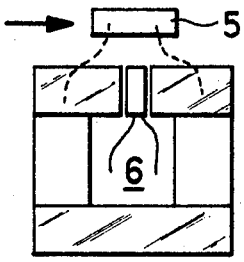
FIG.3
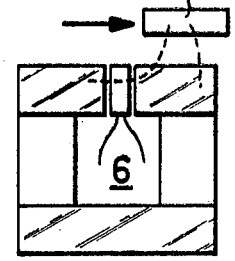
FIG.4
FIG.5
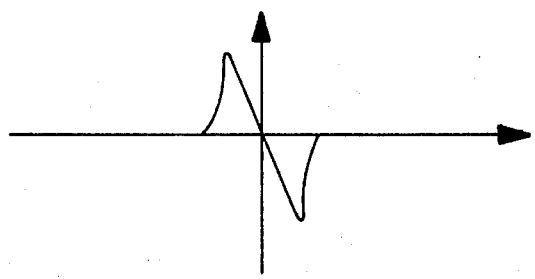

DEVICE FOR DETECTING THE THERMAL OVERLOADS OF A ROTATING MEMBER

The present invention is concerned with the detection of the thermal overloads of a rotating member, particularly the rotor of a rotating electric machine, and more particularly an electric motor.

As already known in the art, there are systems for measuring the temperature of a rotating member by means of thermistors which are mounted on the rotating member and are connected to stationary detection devices by contact with collector elements in the form of slip rings. However, such collector elements are undesirable since they are subject to wear and tear. It has also been proposed in the prior art to determine, without the use of contacts by means of an inductive transmission between the rotating element and the stationary part, the oscillation frequency of an electric circuit mounted on a rotating element and comprising components, such as ceramic capacitors, whose characteristics are matched to the temperature.

The present invention relates to a novel contactless device designed for detecting thermal overloads in a rotating element, which device reduces the number of components to be installed in the rotating element to a single element. More particularly, this device comprises a magnetic piece supported by the rotating member and a stationary magnetic bridge consisting of two arms which receive opposite magnetic fluxes of equal magnitude and which are separated by an air gap in which a magnetic field detector is located, the bridge being balanced under normal conditions and having the axis thereof disposed opposite one of the positions occupied by the aforementioned magnetic piece in the course of the rotation. This device is characterized in that the aforementioned magnetic piece is made from a material whose permeability varies with temperature and whose Curie point, i.e., the critical temperature above which the material loses its permanent or spontaneous magnetization, corresponds to the critical temperature to be detected. Thus, so long as the magnetic piece retains its magnetization, it will induce an imbalance in the magnetic bridge each time it passes; however, if the temperature of the rotating body rises above the Curie point, the magnetic piece will lose its magnetization, and a signal will no longer be derived from the bridge.

Since the magnetic bridge is balanced under normal conditions, no magnetic flux will pass in the air gap, and the magnetic field detector will not emit any signal. If the magnetic piece is below the Curie point when it comes close to the magnetic bridge, it offers a passage to the lines of force of the magnetic field and unbalances the bridge with the result that the magnetic detector is traversed by a differential magnetic flux and emits a polarized voltage. When the piece made from the magnetic material is positioned on the axis of the bridge, the bridge will be balanced once more and the signal emitted by the magnetic detector will disappear. When thereafter the magnetic piece passes over the axis of the magnetic bridge, the unbalance reappears with an inverted polarity of the voltage emitted by the magnetic detector.

If the magnetic piece is above the Curie point, as a result of the temperature of the rotating member on which it is mounted, the amplitude of the signal emitted by the magnetic detector at the time of the passage of this piece in proximity to the magnetic bridge is greatly reduced, and this amplitude reduction makes it possible to detect an excessive temperature of the rotating element or member.

In the case of a rotor of a rotary electrical machine, the piece made from magnetic material is attached or secured to the periphery of the rotor, outside of the magnetic circuit, on a current conductor, such as a short-circuit ring of a squirrel cage motor, a spool head of a coiled rotor, a synchronous motor inductor, or a collector lamella of a direct current motor.

One embodiment of the present invention, which is described only by way of example herein and must not be construed as a limit on the scope of the invention, will now be more specifically described with reference to the accompanying drawings, wherein:

FIG. 1 is a top plan view of a portion of one end of the rotor of a squirrel cage electric motor equipped with the device for detecting thermal overloads proposed by the present invention;

FIGS. 2, 3, and 4 illustrate the relative successive positions of the magnetic piece provided on the rotor with respect to the magnetic bridge when it is in proximity thereto; and FIG. 5 illustrates the amplitude of the signal emitted by the detector, indicated along the ordinate, with respect to the relative position of the magnetic piece and of the detector, indicated along the abscissa.

In FIG. 1, the rotor 1, which is illustrated only in part, comprises a magnetic circuit 2, bars 3, and a short-circuit ring 4. Secured to this ring 4, by brazing for example, is a piece 5 made from a ferromagnetic or ferrimagnetic material, chosen such that the Curie point thereof corresponds to the limit temperature which is admissible in the rotor 1. Disposed opposite the piece 5 is a magnetic bridge 6 consisting of two identical permanent magnets 7 and 8 in the form of bars whose south poles for example are connected by a cross bar or yoke 9, and whose north poles are connected to identical cross bars or yokes 10 and 11 which are separated from one another by an air gap 12 in which a magnetic field detector 13 is inserted.

When the piece 5 approaches from the left of the magnetic bridge 6, the passage which it offers to the lines of force of the magnetic field shown in FIG. 2 unbalances the magnetic bridge and brings about the emission from the detector 13 of a signal whose amplitude is shown in the left portion of FIG. 5. When the piece 5 is positioned on the axis of the magnetic bridge 6, as shown in FIG. 3, the magnetic bridge is once again balanced and the signal emitted by the detector 13 is canceled. Then, when the piece 5 continues its movement to the right of the axis of the magnetic bridge 6, as shown in FIG. 4, the unbalance of the bridge will reappear and produce the emission from the detector 13 of a signal having an inverted polarity, as shown in the right portion of FIG. 5.

The absence of a signal emitted by the magnetic detector 13 indicates an excessive temperature, and this is used to actuate an alarm and/or to operate the circuit breaker of the motor with the aid of devices or means which have not been shown herein because they are conventional and are not a part of the present invention, numerous embodiments of which are rendered possible by the state of the art.

The magnetic fluxes of the arms of the magnetic bridge can be produced either by electromagnets or by permanent magnets. The magnetic field detector can be, for example, a cell whose operation is based upon the Hall effect, a magnetoresistor, or any other conventional detecting device of this type.

While the invention has been shown and described in terms of a preferred embodiment, it will be clear that many changes and modifications will be obvious to one skilled in the art without departing from the scope of the invention.

What is claimed is:

1. An arrangement for detecting thermal overloads in a rotating member, comprising a magnetic piece carried by the rotating member and a stationary magnetic bridge including two arms which normally carry opposite magnetic fluxes of equal magnitude separated by an air gap in which a magnetic field detector is located, said magnetic bridge having its axis passing through said air gap which is disposed adjacent the path of said magnetic piece in the course of the rotation thereof, said magnetic piece being made from a magnetic material whose permeability varies in accordance with the temperature thereof and whose Curie point corresponds to a critical temperature to be detected.

2. An arrangement for detecting thermal overloads according to claim 1 wherein said magnetic piece is secured to the periphery of the rotor of a rotary machine, outside of the magnetic circuit thereof, on a current conductor.

3. An arrangement for detecting thermal overloads according to claim 1 wherein said magnetic field detector is a Hall-effect device.

4. An arrangement for detecting thermal overloads according to claim 1 wherein said magnetic bridge comprises first and second permanent magnets, a first pole piece interconnecting one corresponding pole of said first and second permanent magnets, and second and third pole pieces respectively contacting the other corresponding poles of said first and second permanent magnets so as to form a gap therebetween, said detector being disposed in said gap.

5. An arrangement for detecting thermal overloads according to claim 4 wherein said magnetic field detector is a Hall-effect device.

* * * * *